United States Patent
Defouw et al.

(10) Patent No.: US 6,742,084 B1
(45) Date of Patent: May 25, 2004

(54) CACHING METHOD FOR SELECTING DATA BLOCKS FOR REMOVAL FROM CACHE BASED ON RECALL PROBABILITY AND SIZE

(75) Inventors: Richard J. Defouw, Boulder, CO (US); Alan Sutton, Boulder, CO (US); Ronald W. Korngiebel, Westminister, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/564,261

(22) Filed: May 4, 2000

Related U.S. Application Data

(63) Continuation of application No. 09/079,879, filed on May 15, 1998, now abandoned.
(51) Int. Cl.[7] ............................................. G06F 12/00
(52) U.S. Cl. ....................... 711/133; 711/134; 711/135; 711/136; 711/171
(58) Field of Search .......................... 711/133–136, 171

(56) References Cited

U.S. PATENT DOCUMENTS

| | | |
|---|---|---|
| 4,315,312 A | 2/1982 | Schmidt |
| 4,489,378 A | 12/1984 | Dixon et al. |
| 4,490,782 A | 12/1984 | Dixon et al. |
| 5,226,141 A | 7/1993 | Esbensen |
| 5,721,874 A | 2/1998 | Carnevale et al. |
| 5,778,424 A | 7/1998 | Guy |
| 6,012,126 A * | 1/2000 | Aggarwal et al. .......... 711/133 |

OTHER PUBLICATIONS

Peter Scheuermann, Junho Shim, and Radek Vingralek, Watchman: A Data Warehouse Intelligent Cache Manager, [peters,shimjh,radek]@eecs.nwu.edu, pp. 1–12. Evanston, IL (1996).

Peter Scheuermann, Junho Shim, and Radek Vingralek, A Case for Delay–onscious Caching of Web Documents, pp. 997–1004, Evanston, IL (1997).

Alan Jay Smith, Long Term File Migration: Development and Evaluation of Algorithms, Computer Architecture and Systems, pp. 521–532, University of California, Berkeley (1981).

* cited by examiner

*Primary Examiner*—Do Hyun Yoo
*Assistant Examiner*—Mehdi Namazi
(74) *Attorney, Agent, or Firm*—Brooks & Kushman P.C.

(57) ABSTRACT

A caching method for selecting variable size data blocks for replacement or removal from a cache includes determining the size and the unreferenced time interval of each block in the cache. The size of a block is the amount of cache space taken up by the block. The unreferenced time interval of a block is the time that has elapsed since the block was last accessed, and may be determined using a least recently used (LRU) algorithm. The recall probability of each block in the cache is then determined. The recall probability of a block is a function of its unreferenced time interval and possibly size and other auxiliary parameters. The caching method then determines a quality factor (q) for each block. The (q) of a block is a function of its recall probability and size. The caching method concludes with removing from the cache the block with the lowest (q). Various formulas or methods for determining the quality factor may be chosen so as to minimize the quantity of data that must be staged, minimize mean response time, or maximize the cache hit ratio.

23 Claims, 1 Drawing Sheet

CACHING METHOD FOR SELECTING DATA BLOCKS FOR REMOVAL FROM CACHE BASED ON RECALL PROBABILITY AND SIZE

CROSS-REFERENCE TO RELATED APPLICATIONS

This application is a continuation of U.S. application Ser. No. 09/079,879, filed May 15, 1998, now abandoned.

TECHNICAL FIELD

The present invention relates generally to computer data storage and, more particularly, to data caching methods for managing the contents of a cache that holds data blocks of different sizes, such as the disk cache of a virtual tape subsystem.

BACKGROUND ART

A data-storage technology that offers more performance typically costs more as well. For example, semiconductor memory has better performance (faster response time) than magnetic disk, but also costs more; magnetic disk, in turn, has better performance than magnetic tape, but also costs more. Data caching is a technique for using two data-storage devices technologies in a way that provides performance approximating that of the higher-performing technology at a cost approximating that of the less expensive technology. This is accomplished by using a relatively small amount of the more expensive technology in combination with a large amount of the less expensive technology, but taking steps to ensure that the data that is accessed most frequently is stored in the higher-performing technology. The relatively small amount of storage provided by the more expensive, higher-performing technology is called the cache.

Two steps are taken to ensure that frequently accessed data can be found in the cache. First, every time a data block is requested, that block is moved to the cache if it is not already there, so that it will be available from the cache if it is requested again in the not too distant future. Second, the data blocks that are removed from the cache when it is necessary to make room for incoming blocks are chosen in accordance with a rule that is designed to maximize performance; this rule is known as a block-replacement algorithm and is referred to herein as a caching method.

The best known and most widely used caching method is the Least Recently Used (LRU) algorithm, which selects the least recently used data block (the block in the cache that has gone unused for the longest time) for removal from the cache. This ensures that a data block brought into the cache will stay there as long as can be justified by its frequency of use.

In most caches, the data blocks either all have the same size or have sizes that span a relatively narrow range. As an example of the latter case, the semiconductor cache of a disk storage subsystem is typically divided into slots of fixed size, and a given data block may occupy one to two or three of these cache slots. A very different situation holds in a virtual tape subsystem, where the data blocks (virtual tape volumes) may range in size from 0.1 megabyte, or even smaller, to hundreds of megabytes, or even larger.

A virtual tape subsystem looks just like a conventional tape subsystem to an application. However, when an application thinks it is writing a file to tape, the virtual tape subsystem is actually storing the data on magnetic disk in a logical entity known as a virtual tape volume. Apart from a nominal overhead, the size of the virtual volume is the same as the size of the user's file (either before or after data compression, depending on the implementation). As virtual volumes accumulate in the disk buffer, they are periodically migrated to physical tape in a way conducive to efficient use of tape drives and tape capacity.

The disk buffer of a virtual tape subsystem functions as a cache for virtual tape volumes. When an application requests a virtual volume that is in this cache (a "cache hit"), the requested volume can be accessed quickly because the volume is resident on a direct-access storage device. When an application requests a virtual volume that is no longer in the cache (a "cache miss"), that volume must be read into the cache from tape, which typically requires a mount of a tape, a search on the tape to the requested virtual volume, and then the transfer of that volume to the cache. The time required for the mount, the search, and the data transfer is the "miss penalty," the amount by which the response time for a cache miss exceeds that for a cache hit.

In view of the substantial miss penalty, it is important that the cache be used effectively to keep the overall mean response time as low as possible. However, it is not obvious how to do this when, as in a virtual tape subsystem, the entities that vie for space in the cache extend over a wide range in size. A large data block (virtual volume in the case of virtual tape) takes up a lot of cache space that might be used to store hundreds of smaller blocks. To control the number of cache misses, therefore, a large block must be allowed to remain in the cache only as long as the high cost in cache space can be justified by the expected benefit of its presence in the cache. The standard LRU caching method will not suffice as it does not take block size into account.

Furthermore, keeping the mean response time as low as possible is not simply a matter of minimizing the number of cache misses. The miss penalty is larger for a large block than for a small block owing to the increased time required to read ("stage") the larger block into the cache.

What is needed for a virtual tape subsystem, or any cached storage subsystem where the data blocks extend over a wide range in size, is a caching method that takes the size of the data blocks into account to achieve the best possible performance and is flexible enough that it can be used either to maximize the cache hit ratio (the fraction of block references that are cache hits) or to minimize the overall mean response time.

SUMMARY OF THE INVENTION

Accordingly, it is an object of the present invention to provide a caching method that boosts cache performance over the standard LRU caching method when data blocks that are candidates for storage in the cache extend over a significant size range.

It is another object of the present invention to provide a caching method in which a data block flushed from the cache will always be the least recently used of all the cached blocks within a given size range but not necessarily the least recently used of all the blocks in the cache.

It is a further object of the present invention to provide a caching method that selects cached blocks for removal based on their size and likelihood that they will soon be referenced.

In carrying out the above objects and other objects, features, and advantages, the present invention provides a caching method for selecting data blocks for removal from a cache. The caching method is for use in a virtual tape subsystem or any other cached system of computer data storage in which the data blocks are of variable size.

The caching method includes determining the size and the unreferenced time interval of each data block in the cache. The size of a data block is the amount of cache space taken up by the block. The unreferenced time interval of a data block is the time that has elapsed since the block was last accessed (including the case where the "access" was actually the creation of the block). The recall probability per unit time of each data block in the cache is then determined. The recall probability of a data block is a function of its unreferenced time interval and possibly size and other parameters as well. The caching method then determines a quality factor (q) for each data block. The quality factor (q) of a data block is a function of its recall probability and size. The caching method concludes with removing from the cache the data block with the lowest quality factor (q).

The advantages accruing to the present invention are numerous. The caching method can be used to enhance various performance metrics such as the cache hit ratio, the mean response time, and the bandwidth consumed by the staging activity. The optimal caching strategies for all three metrics can be implemented with the general caching method; selection of the metric to be optimized is accomplished simply by assigning values to a few constants. Further, the caching method can be customized to the data access patterns of a given site by using recall probabilities estimated from access statistics for that site.

These and other features, aspects, and embodiments of the present invention will become better understood with regard to the following description, appended claims, and accompanying drawings.

BEST MODES FOR CARRYING OUT THE INVENTION

Figure 1:
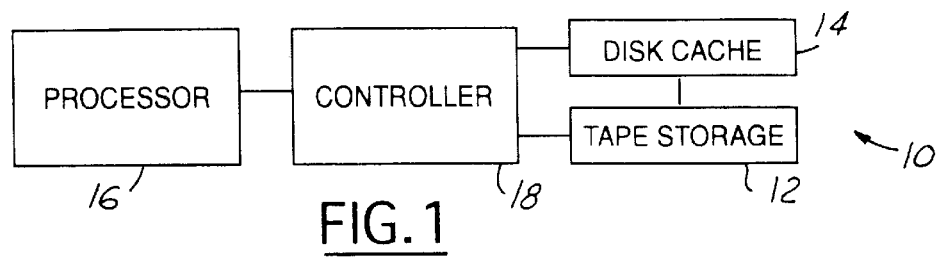
FIG. 1 is a block diagram of an exemplary virtual tape subsystem for use with the caching method of the present invention.

Referring now to FIG. 1, a virtual tape subsystem 10 is shown. Virtual tape subsystem 10 includes magnetic tape storage 12 for storage of data blocks or virtual tape volumes. Subsystem 10 further includes a disk cache 14 having magnetic disk storage capability.

A processor 16 is operable with disk cache 14 via a controller 18 to process virtual volumes stored in the disk cache and tape storage 12 as well as create new virtual volumes. Controller 18 oversees the staging of virtual volumes from tape storage 12 to disk cache 14. Controller 18 also determines which virtual volumes to move from disk cache 14 to tape storage 12 in accordance with the caching method of the present invention.

Figure 2:
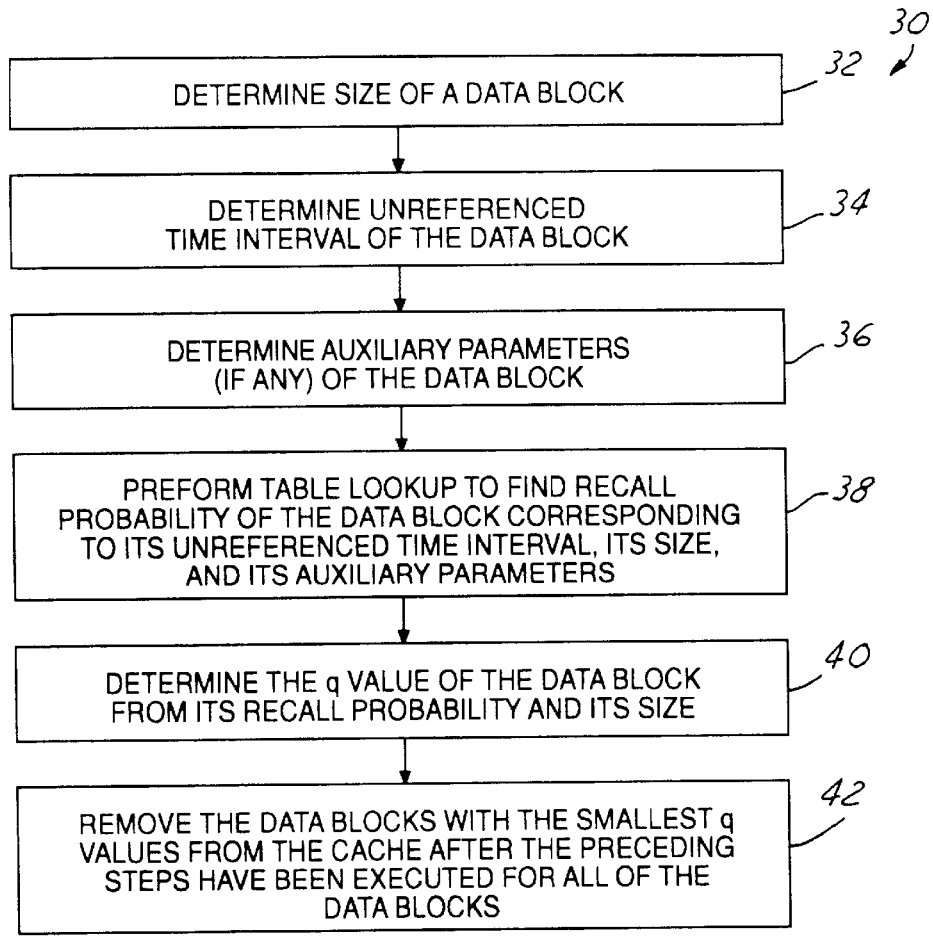
FIG. 2 is a flow diagram representing operation of the caching method.

Referring now to FIG. 2, a flow diagram 30 representing operation of a caching method according to the present invention is shown. In general, flow diagram 30 determines a quality factor, or "q value," for each data block in a cache and removes the blocks having the lowest q values until a predetermined amount of space has been freed in the cache. The data blocks are removed (after being copied to the lower level of the storage hierarchy if not already present there) to make room in the cache for new blocks and blocks that must be staged into the cache on cache misses.

As described below, the q value of a data block is determined from its size (the amount of cache space it requires) and its recall probability. The term "recall" is used herein to refer to any access of an existing block (as opposed to the creation of a new block), regardless of whether the access is a "cache hit" (the requested block is already in the cache) or a "cache miss" (the requested block must be staged into the cache). The recall probability of a data block is determined from its unreferenced time interval (the time elapsed since the block was last accessed) and possibly also its size and other parameters. For this purpose, it is necessary to have a table giving the recall probability for each value of the unreferenced time interval and other parameters. The construction of this table is described below.

Steps 32–40 in flow diagram 30 describe the calculation of the q value for a data block. Step 32 begins with determining the size of the data block. Step 34 then determines the unreferenced time interval of the data block. Step 36 then determines the values of any additional parameters that are to be used to infer the recall probability of the data block. Step 38 then determines the recall probability of the data block by using the parameter values obtained in the preceding steps to find the appropriate entry in a table of recall probabilities. Step 40 determines the q value of the data block from its size and its recall probability, using a simple equation given below. When steps 32–40 have been performed for every data block in the cache that is not being currently accessed, step 42 removes the data blocks with the lowest q values from the cache.

The equation used to determine the q value of a data block from its size and its recall probability depends on the performance objective. The possible objectives include maximizing the cache hit ratio, minimizing the mean response time, and minimizing the quantity of data that must be staged into the cache because of cache misses.

When the objective is to maximize the cache hit ratio, the equation used to determine the q value of a data block is $$q = r(x, s, A)/s,$$

where
s is the size of the data block;
x is the unreferenced time interval of the data block;
A represents auxiliary parameters used in estimating the recall probability of the data block; and
r(x, s, A) is the recall probability of the data block as a function of x, s, and A.

When the objective is to minimize the mean response time, the equation used to determine the q value of a data block is $$q = ((\alpha + \beta s) * r(x, s, A))/s,$$

where $\alpha$ and $\beta$ are constants such that the miss penalty (the amount by which the response time for a cache miss exceeds that for a cache hit) is given by $\alpha + \beta s$. In a virtual tape subsystem, for example, the constant $\alpha$ accounts for the mean time required to mount and load the tape that contains the requested virtual volume and to search to that virtual volume on the tape, while the constant $\beta$ is the reciprocal of the rate at which data can be transferred from the tape to the disk cache (so what $\beta s$ is the data-transfer time for a virtual volume of size s).

When the objective is to minimize the quantity of data that must be staged into the cache because of cache misses, the equation used to determine the q value of a data block is $$q = r(x, s, A).$$

The general equation that covers all three performance objectives is $$q = ((1+as) * r(x, s, A))/(b+cs).$$

If the objective is to maximize the hit ratio, set $a=b=0$ and $c=1$. If the objective is to minimize the mean response time, set $a=\beta/\alpha$, $b=0$, and $c=1$. If the objective is to minimize staging throughput, set $a=c=0$ and $b=1$.

The table that is used to determine the recall probability in step 38 of flow diagram 30 is constructed from observations of actual access patterns of data blocks, in particular, from a trace giving the timestamps of all block accesses during some observation period. From the timestamps, the intervals between successive accesses of the same data block are calculated. The cumulative frequency distribution of these intervals in the form of a histogram that gives the number of intervals that exceeded x for $x=0$, $x=x_1$, $x=x_2$, $x=X_3$, and so on is then generated. Let the $i^{th}$ entry in the histogram be denoted $N(x_i)$, so that $N(x_i)$ is the number of interaccess times that were greater than $x_i$.

The elements of the table are calculated from the values of $N(x)$ as follows. If the x values used in the construction of the histogram are equally spaced (i.e., if $x_1=x_2-x_1=x_3-x_2$, and so on), the elements of the table are $$\log[N(x_i)/N(x_{i+1})],$$

where any value can be used for the base of the logarithm. The first element, for example, is $\log[N(0)/N(x_1)]$. If the x values used in the construction of the histogram are not equally spaced, the elements of the table are $$\{\log[N(x_i)/N(x_{i+1})]\}/(x_{i+1}-x_i).$$

Thus, the first element is $\{\log[N(0)/N(x_1)]\}/x_1$ and the second element is $\{\log[N(x_1)/N(x_2)]\}/(x_2-x_1)$.

Each of the elements computed in this way is associated in the table with its corresponding value of $x_i$. The table lookup for a data block returns the element corresponding to $x_k$, where $x_k$ is the largest of the $x_i$ that is smaller than the unreferenced time interval of the data block. For example, if the unreferenced time interval for a given data block is greater than $x_{13}$ but smaller than $x_{14}$, the table lookup should return $[\log[N(x_{13})/N(x_{14})]]/(x_{14}-x_{13})$ in the case of unequal spacing.

The table constructed by the procedure just described is one-dimensional: the table lookup for a data block requires just one parameter, the unreferenced time interval of the block. Depending on the access patterns at a particular site, it may be possible to obtain more accurate recall probabilities by using one or more additional parameters such as data block size. To do this, the data blocks are divided into classes such that all blocks in a given class have the same values of the additional parameters or values that lie in the same bins. For each class, a one-dimensional table is constructed as described above. The set of one-dimensional tables built in this way constitutes a multi-dimensional table, and this is the table that is consulted in step 38 of flow diagram 10.

The expression $\log[N(x_i)/N(x_{i+1})]$ used to compute the table elements is approximately equal to $$[N(x_i)-N(x_{i+1})]/N(x_i)$$

(apart from a constant factor that must be included if natural logarithms are not being used) provided that $N(x_{i+1})$ is not too much smaller than $N(x_i)$. In fact, this expression can be used instead of the logarithmic expression used to compute the table elements. What an element of the table measures, therefore, is the fraction of interaccess times exceeding $x_i$ that do not exceed $x_{i+1}$. This, in turn, indicates the recall probability that a data block with unreferenced time interval $x_i$ will be accessed before its unreferenced time interval has increased to $x_{i+1}$. The recall probability is divided by $(x_{i+1}-x_i)$ to get the probability per unit time (except that this division can be omitted for equal spacing because it would change all the table elements by the same factor). Thus, the value returned by the table lookup for a particular data block is essentially the probability that that block is about to be accessed, i.e., the recall probability per unit time.

With this understanding of the table elements, the q values can now be understood. If the objective is to maximize the number of cache hits, the t able element associated with a particular data block is the probability that that block will produce an immediate payoff (i.e., a cache hit) if it is kept in the cache. on the other hand, the price to be paid for this payoff is measured by the amount of cache space required by the data block (which affects the number of cache hits that can be obtained from other blocks). The q value of the data block is just the ratio of its expected payoff to its cost, or $r(x, s, A)/s$.

If the objective is to minimize the mean response time, the expected payoff of a data block is the miss penalty $(\alpha+\beta s)$ associated with the block multiplied by the probability that the block is about to be accessed, for this product gives the miss penalty that would be saved, on the average, by having the block in the cache. In this case, the ratio of the expected payoff to the cost is $(\alpha+\beta s) * r(x, s, A)/s$, which is just the q value of the objective.

A similar argument holds if the objective is to minimize the quantity of data that must be staged into the cache on cache misses.

These explanations give some plausibility to the caching method of the present invention. However, this method is actually based on a much more solid foundation, a mathematical demonstration that the method optimizes performance as measured by the chosen objective. This demonstration follows.

A. Optimal Cache Boundaries

Figure 3:
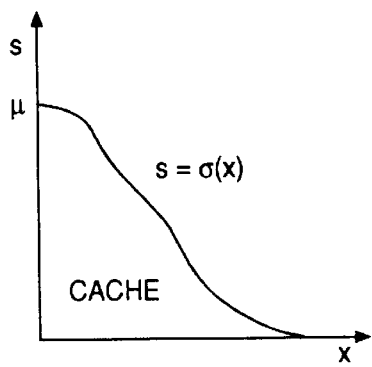
FIG. 3 is a graph of the curve defining the boundary separating the regions of the x-s plane occupied by data blocks inside and outside of a cache.

To investigate how to select data blocks for removal from the cache on the basis of their size s and their unreferenced time interval x, let the boundary of the cache in the x-s plane be defined by the curve $s=\sigma(x)$ as shown in FIG. 3. That is, a block of size s and unreferenced time interval x is allowed to remain in the cache if and only if $s<\sigma(x)$.

A large block can take up the same cache space as hundreds of smaller blocks. A large block should be allowed to remain in the cache only as long as this high cost in cache space can be justified by the expected benefit of its presence in the cache. This residency time is expected to decrease with increasing cost (i.e., size), and this expectation is reflected in the shape of the cache boundary shown in FIG. 3. However, the optimal shape of the cache boundary depends on the performance objective of interest. If the objective is to maximize the cache hit ratio, two blocks of very different sizes have the same expected benefit if they have the same recall probability. If the objective is to minimize response time, however, the larger block has a larger potential benefit because its access from the cache saves a larger amount of data transfer. These considerations are quantified in the following subsections, where the optimal cache boundaries for three measures of performance are derived using the calculus of variations.

1. The Hit Ratio. Define a density function $n(x,s)$ such that the number of blocks with size between s and $s+ds$ and unreferenced time interval between x and $x+dx$ is $n(x,s)\,ds$ dx. Also define a recall probability function r(x,s) such that r(x,s) dt is the probability that a given block of size s and unreferenced time interval x will be referenced before its unreferenced time interval has increased to x+dt. Given the cache boundary s=σ(x), the rate of cache hits is then $$H[\sigma(x)] = \int_0^\infty \int_0^{\sigma(x)} n(x, s) r(x, s) ds\, dx, \quad (1)$$

while the aggregate size of the blocks residing in the cache is $$S[\sigma(x)] = \int_0^\infty \int_0^{\sigma(x)} n(x,s) s\, ds\, dx. \quad (2)$$

In view of the constraint $$S[\sigma(x)] = S, \quad (3)$$

where S is the cache size, the optimal cache boundary s=σ(x) renders H[σ(x)] stationary with respect to any variation in σ(x) that does not change S[σ(x)]. The variations of the two functionals resulting from the variation δσ(x) are $$\delta H[\sigma(x)] = \int_0^\infty n(x, \sigma(x)) r(x, \sigma(x)) \delta\sigma(x) dx \quad (4)$$

and $$\delta S[\sigma(x)] = \int_0^\infty n(x, \sigma(x)) \sigma(x) \delta\sigma(x) dx. \quad (5)$$

The requirement that δH[σ(x)]=0 for any δσ(x) such that δS[σ(x)]=0 implies that the coefficient of δσ(x) in the integrand of Equation 4 must be a constant multiple of the corresponding coefficient in Equation 5, so that $$\lambda \sigma(x) = r(x, \sigma(x)), \quad (6)$$

where λ is some constant (essentially the Lagrange multiplier).

For simplicity, suppose that the recall probability does not depend on the block size, in which case Equation 6 reduces to $$\lambda \sigma(x) = r(x). \quad (7)$$

The probability of imminent recall is expected not to increase as the time elapsed since the last access increases, that is, $dr(x)/dx \leq 0$. It then follows from Equation 7 that $d\sigma(x)/dx \leq 0$, as anticipated in FIG. 3. Equivalently, $dx/ds \leq 0$ along the cache boundary, which means that the time an unreferenced block is retained in the cache decreases as the block size increases. This result is expected, but Equation 7 shows that the precise relationship is elegantly simple. The cache boundary that maximizes the hit ratio has the same shape as the recall probability function.

After a block has been recalled, it moves away from the s-axis in FIG. 3 along a line of constant s, and is removed from the cache when this path crosses the! cache boundary. As long as $dr(x)/dx \leq 0$ over the range of x of interest, the path of the block in the x-s plane does not cross the cache boundary again, so the block remains outside the cache until its next recall. However, if $dr(x)/dx > 0$ over some range of x, the block must be prestaged (that is, brought back into the cache in anticipation of a possible recall) if its size is such that its path in the x-s plane crosses the cache boundary a second time.

2. The Response Time. The cache hit ratio is the performance metric of interest only if all cache misses suffer the same performance penalty. However, one component of the miss penalty, the data-transfer time, depends on the size of the block and varies significantly from one block to another if the size difference is sufficiently great. Assume that the penalty for a cache miss (i.e., the amount by which the response time for a miss exceeds that for a hit) is a linear function of the block size: α+βs.

The objective is to minimize the mean response time, which is equivalent to minimizing the aggregate miss penalty given by:

$$\pi[\sigma(x)] = \int_0^\infty \int_{\sigma(x)}^\infty n(x, s) r(x,s)(\alpha+\beta s) ds\, dx. \quad (8)$$

The optimal cache boundary s=σ(x) renders π[σ(x)] stationary with respect to any variation in σ(x) that does not change S[σ(x)]. The variation of π[σ(x)] resulting from the variation δσ(x) is:

$$\delta \pi[\sigma(x)] = -\int_0^\infty n(x,\sigma(x)) r(x,\sigma(x))[\alpha+\beta\sigma(x)] \delta\sigma(x) dx. \quad (9)$$

From this equation together with Equation 5 and the requirement that δπ[σ(x)]=0 for any δσ(x) such that δS[σ(x)]=0, the optimal cache boundary must satisfy $$\lambda\sigma(x) = r(x,\sigma(x))[\alpha+\beta\sigma(x)] \quad (10)$$

for some constant λ, so that $$\sigma(x) = \frac{\alpha r(x)}{\lambda - \beta r(x)}, \quad (11)$$

where the s dependence of the recall probability has been suppressed for simplicity. This result reduces to Equation 7 in the case of constant miss penalty (β=0) as expected. As before, the condition required for $d\sigma(x)/dx \leq 0$ (which means prestaging is not required) is $dr(x)/dx \leq 0$.

3. Stagin Throughput. Minimizing the data throughput associated with staging activity is accomplished by minimizing the right side of Equation 8 with α=0; from Equation 10 the optimal cache boundary in this scenario satisfies $$r(x,\sigma)x)) = \lambda, \quad (12)$$

where λ is some constant. Thus, the optimal cache boundary in the x-s plane is a level curve of the recall probability function. If the recall probability is independent of block size, the level curve is just a line of constant x, and the optimal caching policy is just the usual LRU algorithm.

4. Multiple Classes. So far the same recall probability function, r(x,s), has been assumed for all blocks. This is unsatisfactory from two points of view. First, workloads generally consist of multiple components that one would expect to be characterized by different recall probability functions. Second, a block goes through a life cycle that is reflected in its recall probability. At any given time, different blocks are at different stages of their life cycles and therefore have different recall probabilities even if all blocks go through the same life cycle.

To address these concerns, imagine the blocks to be divided into classes characterized by different recall probability functions. Use a discrete parameter k to identify the class to which a block belongs. This parameter specifies a workload component and/or a stage in the life cycle of the block. A continuous parameter (namely, the age of the block) might be more appropriate for the life cycle, but then regard the discrete parameter k as specifying a range of values (a bin) for the continuous parameter.

There are two ways to handle inhomogeneity in the recall characteristics of the blocks. The first way is to ignore it. This approach is perfectly valid, as will be shown in Section 5. However, if the recall probability functions of the various classes are known, it is likely that more accurate caching decisions can be made if this information is taken advantage of. The way to do this will be explained in Section 6.

5. Ignoring Class Structure. It will now be shown that inhomogeneity in the recall characteristics of the blocks does not invalidate the cache boundaries derived in the preceding sections. Suppose that the objective is to maximize the hit ratio, but it will be apparent that the same argument applies to the other performance metrics.

Given some definition of the class parameter k, define for each class a density function $n_k(x,s)$ such that the number of blocks in class k with size between s and s+ds and unreferenced time interval between x and x+dx is $n_k(x,s)$ ds dx. Also define a recall probability function $r_k(x,s)$ such that $r_k(x,s)$ dt is the probability that a given block in class k of size s and unreferenced time interval x will be referenced before its unreferenced time interval has increased to x+dt.

Given the cache boundary $s=\sigma(x)$, the rate of cache hits is $$H[\sigma(x)] = \int_0^\infty \int_0^{\sigma(x)} \sum_k n_k(x,s) r_k(x,s) ds dx, \quad (13)$$

while the aggregate size of the blocks in the cache is $$S[\sigma(x)] = \int_0^\infty \int_0^{\sigma(x)} \sum_k n_k(x,s) s ds dx. \quad (14)$$

These equations, of course, are immediate extensions of Equations (1) and (2). The rest of the variational is argument is completely analogous to that in Section 1, and the result is that Equation 6 generalizes to $$\lambda\sigma(x) = <r(x,\sigma(x))>, \quad (15)$$

where $$\langle r(x,s) \rangle = \frac{\sum_k n_k(x,s) r_k(x,s)}{\sum_k n_k(x,s)} \quad (16)$$

is just the mean recall probability of all the blocks with unreferenced time interval x and size s. Comparing Equations 6 and 15, the cache boundary is unaffected by the class structure provided a suitable mean of the recall probability functions is used.

6. Taking Advantage of Class Structure. Now suppose that the recall probability function for each class and the class membership of each block are known to the entity responsible for caching decisions. To take advantage of this information, allow the boundary of the cache in the x-s plane to vary from one class to another, and define this boundary for class k by the curve $s=\sigma_k(x)$ For a given set of boundary functions, $\{\sigma_k(x)\}$, the cache hit rate is $$H[\{\sigma_k(x)\}] = \sum_k \int_0^\infty \int_0^{\sigma_k(x)} n_k(x,s) r_k(x,s) ds dx, \quad (17)$$

while the aggregate size of the blocks contained within the boundaries is $$S[\{\sigma_k(x)\}] = \sum_k \int_0^\infty \int_0^{\sigma_k(x)} n_k(x,s) s ds dx. \quad (18)$$

To maximize the cache hit ratio, find the set of boundary curves that renders $H[\{\sigma_k(x)\}]$ stationary with respect to any variation in the set $\{\sigma_k(x)\}$ that does not change $S[\{\sigma_k(x)\}]$, since the latter quantity is subject to a constraint analogous to Equation 3. The variations of the two functionals resulting from a set of variations $\{\delta\sigma_k(x)\}$ are $$\delta H[\{\sigma_k(x)\}] = \sum_k \int_0^\infty n_k(x,\sigma_k(x)) r_k(x,\sigma_k(x)) \delta\sigma_k(x) dx \quad (19)$$

and $$\delta S[\{\sigma_k(x)\}] = \sum_k \int_0^\infty n_k(x,\sigma_k(x)) \sigma_k(x) \delta\sigma_k(x) dx. \quad (20)$$

The requirement that $\delta H[\{\sigma_k(x)\}]=0$ for any set $\{\delta\sigma_k(x)\}$ such that $\delta S[\{\sigma_k(x)\}]=0$ implies that the ratio of the coefficient of $\delta\sigma_k(x)$ in the integrand of Equation 19 to the corresponding coefficient in Equation 20 must be independent of both x and k, so that $$\lambda\sigma_k(x) = r_k(x,\sigma_k(x)) \quad (21)$$

for some constant $\lambda$. This result is the appropriate generalization of Equation 6.

Just as Equation 21 can be obtained from Equation 6 by appending the subscript k to r and $\sigma$, the cache boundaries that optimize the mean response time and the staging throughput can be obtained by the same transformation of Equations 11 and 12, respectively.

B. Caching Methods

Methods for enforcing the optimal cache boundaries are now given.

Suppose the objective is to maximize the hit ratio, so that the optimal cache boundary is give by Equation 6, which can be rewritten as:

$$\frac{r(x,\sigma(x))}{\sigma(x)} = \lambda. \quad (22)$$

This equation tells that the quantity $$q = \frac{r(x,s)}{s} \quad (23)$$

is constant on the curve $s=\sigma(x)$ The quantity q evaluated for a given block is a benefit/cost ratio indicating the attractiveness of the block as a candidate for caching: the recall probability $r(x,s)$ measures the potential benefit of the block's presence in the cache (the likelihood of a cache hit), while its size x measures the cost of holding the block in the cache (in the form of lost opportunity due to the exclusion of other blocks). With $q=\lambda$ on the cache boundary, it is clear that the blocks in the cache should have $q>\lambda$, while the blocks outside the cache should be those with $q<\lambda$. Therefore, the way to enforce the optimal cache boundary when it is time to make room in the cache is to remove the block with the smallest value of q.

If the goal is to minimize the mean response time, Equation 10 tells that the quantity $$q = \frac{(\alpha+\beta s) r(x,s)}{s} \quad (24)$$

is constant on the optimal cache boundary. This q can also be regarded as a benefit/cost ratio, for the numerator is essentially the expected miss penalty that would be saved by holding a block with parameters x and s in the cache. As before, the way to enforce the optimal cache boundary is to remove the block with the smallest value of q.

To accommodate all three cache boundaries, define $$q = \frac{(1+as)r(x,s)}{b+cs}. \tag{25}$$

If the objective is to maximize the hit ratio, set a=b=0 and c=1. If the objective is to minimize the mean response time, set a=$\beta$/$\alpha$, b=0, and c=1. And if the objective is to minimize staging throughput, set a=c=0 and b=1. Whichever assignments are in force, compute q for each block in the cache and delete the block with the smallest value of q.

Equation 21 makes it clear that multiple classes can be handled within the same framework. Given additional information about the recall probability of a block (that is, given the class membership of the block), that information should be used in calculating the quality figure q for that block; that is, replace r(x,s) by $r_k$(x,s) in Equation 25, where k is the class parameter.

Estimating the Recall Probability Function

To implement the caching methods, the recall probability function must be known. A relationship that can be used to estimate r(x) from empirical data is now derived.

If T denotes the time interval between successive accesses of the same block, the distribution of interreference times can be characterized by the function p(x)≡Pr(T>x), the probability that T is greater than x. Assume that p(x) has been estimated from a trace giving the timestamps of all block accesses during some observation period. From the definition of the recall probability function, $$Pr(T>x+dx|T>x)=1-r(x)dx, \tag{26}$$

which is equivalent to $$\frac{p(x+dx)}{p(x)} = 1 - r(x)dx \tag{27}$$

by the definition of conditional probability. Expanding p(x+dx) (or using the definition of the derivative after some rearrangement), $$r(x) = \frac{-1}{p(x)} \cdot \frac{dp(x)}{dx}. \tag{28}$$

Given p(x) at appropriately spaced values of x, compute r(x) by a finite-difference approximation to the right side of this equation. equivalently, integrate this equation over x from x=$x_1$ to x=$x_2$, obtaining $$r_{12} = \frac{\ln\left[\frac{p(x_1)}{p(x_2)}\right]}{x_2 - x_1}, \tag{29}$$

where $r_{12}$ is the mean of r(x) over the range x=$x_1$ to x=$x_2$ defined by $$\int_{x_1}^{x_2} r(x)dx = r_{12}(x_2 - x_1). \tag{30}$$

Thus, given p($x_1$) and p($x_2$), use Equation 29 to get a representative value of r(x) between x=$x_1$ and x=$x_2$. If r(x,s), $r_k$(x), or $r_k$(x,s) is required, proceed in the same way, using the function p(x) determined empirically for each subset of blocks (i.e. for each bin of block sizes and/or each block class). The resulting recall probability function is tabulated for quick reference when it is time to compute the q values of all the blocks that are candidates for migration or deletion.

It will now be verified that this procedure works when different blocks obey different recall probability functions, but the caching algorithm uses the same recall probability function for all blocks. The probability that a given block of unreferenced time interval x, size s, and unknown class membership will not be referenced during the next interval of duration dx is $$Pr(T>x+dx|T>x;s) = \sum_k \frac{n_k(x,s)}{n_{tot}(x,s)}[1 - r_k(x,s)dx], \tag{31}$$

where k is the class parameter, and $$n_{tot}(x,s) = \sum_k n_k(x,s). \tag{32}$$

Equation 31 is equivalent to $$Pr(T>x+dx|T>x;s)=1-<r(x,s)>dx, \tag{33}$$

where (r(x,s)) is given by Equation 16. With Equation 33 taking the place of Equation 26, the derivation proceeds as before, so that <r(x,s)> can be estimated from Equation 29. This completes the demonstration begun in Section A.5 that inhomogeneity in the recall characteristics of the data blocks can be ignored.

Thus it is apparent that there has been provided, in accordance with the present invention, a caching method for selecting data blocks for removal from a cache that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A caching method for selecting variable sized data blocks for removal from a cache in order to either maximize the cache hit ratio of data blocks in the cache, minimize the quantity of data that must be staged into the cache because of cache misses, or minimize the mean response time of data block accesses, the method comprising:

determining the size of each data block in the cache, wherein the size of a data block is the amount of cache space taken up by the data block;

determining the unreferenced time interval of each data block in the cache, wherein the unreferenced time interval of a data block is the time that has elapsed since the data block was last accessed;

determining the recall probability per unit time of each data block in the cache, wherein the recall probability of a data block is a function of its unreferenced time interval;

determining a quality factor (q) for each data block in the cache, wherein the quality factor (q) of a data block is a function of at least one of its recall probability and size; and removing from the cache the data block with the lowest quality factor (q); wherein the quality factor (q) of a data block is given by $$q=((1+as)*r(x))/(b+cs),$$

where a, b, and c are constants;

x is the unreferenced time interval of the data block;

s is the size of the data block; and r(x) is the recall probability of the data block as a function of its unreferenced time interval.

2. The method of claim 1 further comprising:

selecting the cache hit ratio of the data blocks in the cache to be maximized by setting a=b=0 and c=1 such that the quality factor (q) for a data block is given by $$q=r(x)/s.$$

3. The method of claim 1 further comprising:

minimizing the quantity of data that must be staged into the cache because of cache misses by setting a=c=0 and b=1 such that the quality factor (q) for a data block is given by $$q=r(x).$$

4. The method of claim 1 further comprising:

selecting the mean response time of data block accesses to be minimized by setting a=β/α, b=0, and c=1 such that the quality factor (q) for a data block is given by $$q=((\alpha+\beta s)*r(x))/s,$$

where

α is a constant which accounts for the fixed part of the time required to stage a data block to the cache; and β is a constant which accounts for the time required to transfer the data block from an external storage device to the cache.

5. The method of claim 1 wherein the recall probability per unit time of each data block in the cache is a function of its unreferenced time interval and size.

6. The method of claim 5 wherein the quality factor (q) of a data block is given by $$q=((1+as)*r(x,s))/(b+cs),$$

where a, b, and c are constants;

x is the unreferenced time interval of the data block;

s is the size of the data block; and r(x,s) is the recall probability of the data block as a function of its unreferenced time interval and size.

7. The method of claim 6 further comprising:

selecting the cache hit ratio of the data blocks in the cache to be maximized by setting a=b=0 and c=1 such that the quality factor (q) for a data block is given by $$q=r(x,s)/s.$$

8. The method of claim 6 further comprising:

minimizing the quantity of data that must be staged into the cache because of cache misses by setting a=c=0 and b=1 such that the quality factor (q) for a data block is given by $$q=r(x,s).$$

9. The method of claim 6 further comprising:

selecting the mean response time of data block accesses to be minimized by setting a=β/α, b=0, and c=1 such that the quality factor (q) for a data block is given by $$q=((\alpha+\beta s)*r(x,s))/s,$$

where

α is a constant which accounts for the fixed part of the time required to stage a data block to the cache; and β is a constant which accounts for the time required to transfer the data block from an external storage device to the cache.

10. The method of claim 5 further comprising:

determining an auxiliary parameter of each data block in the cache, wherein the recall probability per unit time of each data block in the cache is a function of its unreferenced time interval, size, and auxiliary parameter.

11. The method of claim 10 wherein the quality factor (q) of a data block is given by $$q=((1+as)*r(x,s,A))/(b+cs),$$

where a, b, and c are constants;

x is the unreferenced time interval of the data block;

s is the size of the data block;

A is the auxiliary parameter of the data block; and r(x,s,A) is the recall probability of the data block as a function of its unreferenced time interval, size, and auxiliary parameter.

12. The method of claim 5 wherein removing from the cache the data block with the lowest quality factor (q) comprises removing from the cache the data blocks with the lowest quality factors until a predetermined amount of space is cleared in the cache.

13. The method of claim 5 further comprising:

copying the data block with the lowest quality factor (q) from the cache to an external storage device prior to removing the data block from the cache.

14. In a storage system having a cache and an external storage device for storing data blocks, wherein a plurality of variable sized data blocks are stored in the cache, a caching method for selecting data blocks for removal from the cache in order to either maximize the cache hit ratio of data blocks in the cache, minimize the quantity of data that must be staged into the cache because of cache misses, or minimize the mean response time of data block accesses, the method comprising:

determining the size of each data block in the cache, wherein the size of a data block is the amount of cache space taken up by the data block;

determining the unreferenced time interval of each data block in the cache, wherein the unreferenced time interval of a data block is the time that has elapsed since the data block was last accessed;

determining the recall probability per unit time of each data block in the cache, wherein the recall probability of a data block is a function of its unreferenced time interval;

determining a quality factor (q) for each data block in the cache, wherein the quality factor (q) of a data block is a function of at least one of its recall probability and size; and removing from the cache the data block with the lowest quality factor (q); wherein the quality factor (q) of a data block is given by $$q=((1+as)*r(x))/(b+cs),$$

where a, b, and c are constants;

x is the unreferenced time interval of the data block;

s is the size of the data block; and r(x) is the recall probability of the data block as a function of its unreferenced time interval.

15. In a virtual tape subsystem having a disk cache and magnetic tape storage, wherein a plurality of variable sized virtual volumes are stored in the disk cache, a caching method for selecting volumes for removal from the disk cache in order to either maximize the cache hit ratio of data blocks in the disk cache, minimize the quantity of data that must be staged into the disk cache because of cache misses, or minimize the mean response time of data block accesses, the method comprising:

determining the size of each volume in the disk cache, wherein the size of a volume is the amount of cache space taken up by the volume;

determining the unreferenced time interval of each volume in the disk cache, wherein the unreferenced time interval of a volume is the time that has elapsed since the volume was last accessed;

determining the recall probability per unit time of each volume in the disk cache, wherein the recall probability of a volume is a function of its unreferenced time interval;

determining a quality factor (q) for each volume in the disk cache, wherein the quality factor (q) of a volume is a function of at least one of its recall probability and size; and removing from the disk cache the volume with the lowest quality factor (q); wherein the quality factor (q) of a volume is given by $$q=((1+as)*r(x))/(b+cs),$$

where a, b, and c are constants;

x is the unreferenced time interval of the volume;

s is the size of the volume; and r(x) is the recall probability of the volume as a function of its unreferenced time interval.

16. The method of claim 15 further comprising:

selecting the cache hit ratio of the volumes in the cache to be maximized by setting a=b=0 and c=1 such that the quality factor (q) for a volume is given by $$q=r(x)/s.$$

17. The method of claim 15 further comprising:

minimizing the quantity of data that must be staged into the cache because of cache misses by setting a=c=0 and b=1 such that the quality factor (q) for a volume is given by $$q=r(x).$$

18. The method of claim 15 further comprising:

selecting the mean response time of volume accesses to be minimized by setting a=β/α, b=0, and c=1 such that the quality factor (q) for a volume is given by $$q=((\alpha+\beta s)*r(x))/s,$$

where

α is a constant which accounts for the fixed part of the time required to stage a volume to the disk cache; and β is a constant which accounts for the time required to transfer the volume from the magnetic tape storage device to the disk cache.

19. The method of claim 15 wherein the recall probability per unit time of each volume in the disk cache is a function of its unreferenced time interval and size.

20. The method of claim 19 wherein the quality factor (q) of a volume is given by $$q=((1+as)*r(x,s))/(b+cs),$$

where a, b, and c are constants;

x is the unreferenced time interval of the volume;

s is the size of the volume; and r(x,s) is the recall probability of the volume as a function of its unreferenced time interval and size.

21. The method of claim 20 further comprising:

selecting the cache hit ratio of the volumes in the cache to be maximized by setting a=b=0 and c=1 such that the quality factor (q) for a volume is given by $$q=r(x,s)/s.$$

22. The method of claim 20 further comprising:

minimizing the quantity of data that must be staged into the cache because of cache misses by setting a=c=0 and b=1 such that the quality factor (q) for a volume is given by $$q=r(x,s).$$

23. The method of claim 20 further comprising:

selecting the mean response time of volume accesses to be minimized by setting a=β/α, b=0, and c=1 such that the quality factor (q) for a volume is given by $$q=((\alpha+\beta s)*r(x,s))/s,$$

where

α is a constant which accounts for the fixed part of the time required to stage a volume to the cache; and β is a constant which accounts for the time required to transfer the volume from the magnetic storage device to the cache.

* * * * *